United States Patent
Ramaley et al.

(10) Patent No.: US 6,687,741 B1
(45) Date of Patent: Feb. 3, 2004

(54) SENDING A FILE AS A LINK AND/OR AS AN ATTACHMENT

(75) Inventors: Alan Ramaley, Seattle, WA (US); Suresh Tharamal, Redmond, WA (US); Sean E. McAteer, Seattle, WA (US); Thomas W. Olsen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/577,651

(22) Filed: May 24, 2000

(51) Int. Cl.$^7$ ............................................. G06F 15/16
(52) U.S. Cl. ..................................................... 709/206
(58) Field of Search ................................ 709/205, 206, 709/219, 232, 238, 207

(56) References Cited

U.S. PATENT DOCUMENTS

| | | | |
|---|---|---|---|
| 5,418,908 A | * 5/1995 | Keller et al. | 709/206 |
| 5,771,355 A | * 6/1998 | Kuzma | 709/232 |
| 5,781,901 A | * 7/1998 | Kuzma | 707/10 |
| 5,903,723 A | * 5/1999 | Beck et al. | 709/200 |
| 6,009,462 A | * 12/1999 | Birrell et al. | 709/206 |
| 6,275,848 B1 | * 8/2001 | Arnold | 709/206 |
| 6,327,612 B1 | * 12/2001 | Watanabe | 709/206 |

* cited by examiner

Primary Examiner—Dung C. Dinh
Assistant Examiner—Scott Klinger
(74) Attorney, Agent, or Firm—Merchant & Gould P.C.

(57) ABSTRACT

A desktop application program provides a single entry point for indicating that a file is to be sent to a recipient. In response to an indication that the file is to be sent, a determination is automatically made as to whether the file should be sent as a link, as an attachment, or as both a link and an attachment. If the file has not been saved to a disk location or if the file has not been saved to a shared disk location, the file is sent as an attachment to an e-mail note. If the file has been saved to a shared disk location, the file is sent to the recipient as a link in an e-mail note. In order to determine if the file saved to the shared disk location should also be sent as an attachment, a registry is checked for a send preference regarding shared files. If a send preference indicates that shared files are to be sent as attachments, the file is sent as both a link and an attachment. If a send preference indicates that shared files are not to be sent as attachment, the file is sent only as a link. If the sender has not previously indicated a send preference, the sender may be prompted to input a signal indicating whether the file is to be sent as an attachment. A send preference may be created in response to the signal, if the sender so desires.

25 Claims, 3 Drawing Sheets

SENDING A FILE AS A LINK AND/OR AS AN ATTACHMENT

FIELD OF THE INVENTION

Figure 1:
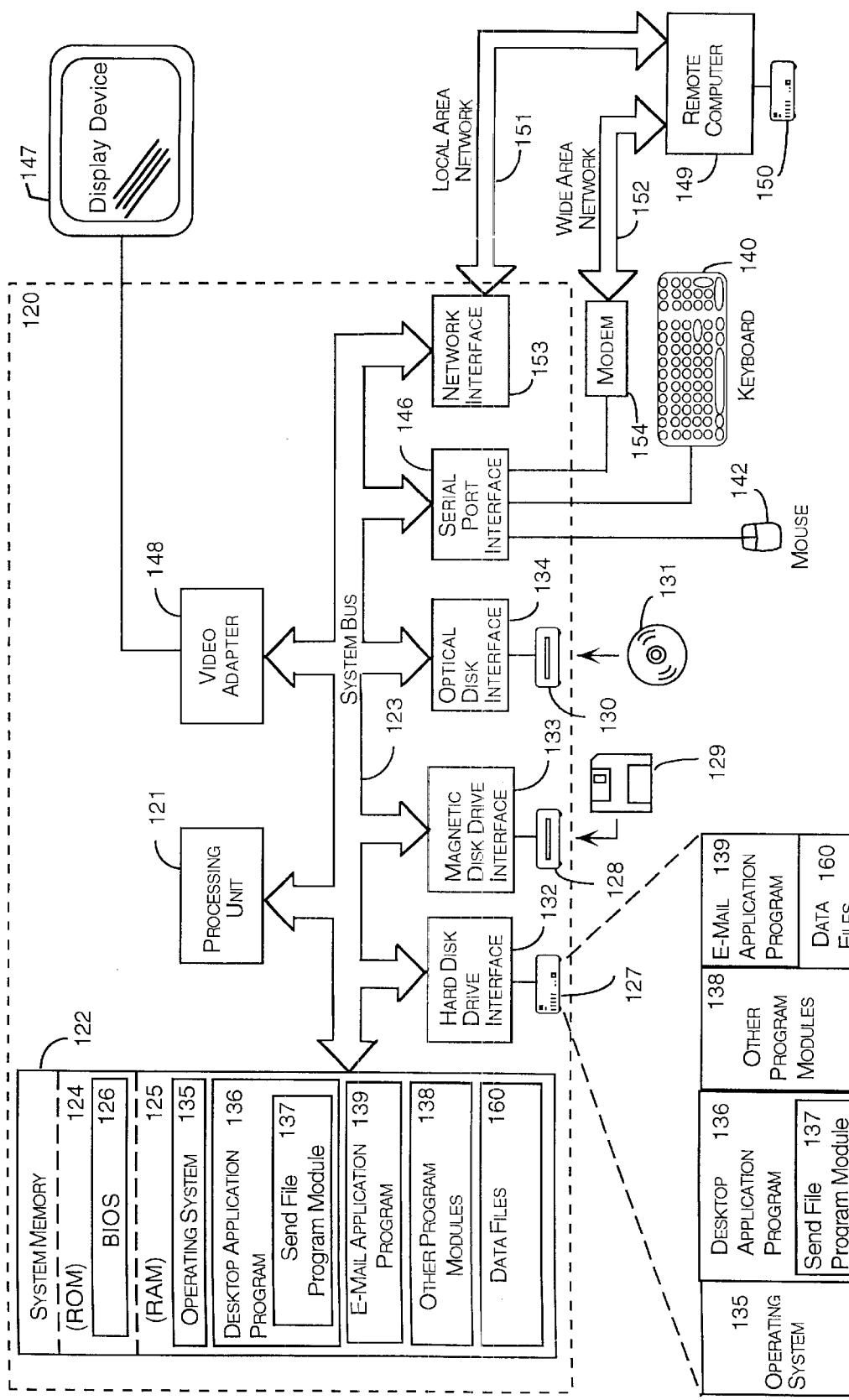

The present invention generally relates to sending a document from a sender to a recipient. More particularly, the present invention relates to automatically determining whether to send a document from a sender to a recipient as a link, as an attachment or as both a link and an attachment.

BACKGROUND OF THE INVENTION

Desktop application programs permit a user to create and modify data files comprising word processing documents, spreadsheet documents, multimedia presentations, images, sounds, and the like. In some cases, the sender of a file may want to share the file with one or more other users. Sometimes, the sender will create a printout of the file, or save an electronic copy of the file on a floppy diskette, so as to physically deliver the file to the intended recipient, However, the sender also has many options for electronically sending a copy of the file to a recipient. For example, electronic mail (e-mail) is a convenient and well-known mechanism for sharing information and files in a networked computer environment.

A desktop application program may permit a sender to send a file to a recipient as either an attachment to an e-mail note, or as a "link" to a shared disk location. An attachment, also referred to as an enclosure, is an electronic copy of the file. As used herein, the term "slink" refers to a reference, such as a uniform resource locator (URL), which points to the disk location where the file is stored. A link is typically "hot" or "active," such that when the recipient double-clicks on the link when executing the appropriate application program, the application program will attempt to automatically retrieve the file from its shared disk location.

Desktop application programs that support sending a file as an attachment allow the sender to manipulate various user interface controls in order to generate an input command indicating that the file is to be sent as an attachment to an e-mail note. In response to the sender's input commands, the desktop application program interacts with an e-mail application program in order to create a new e-mail note. The desktop application program then creates a copy of the file and attaches the copy to the new e-mail note. The sender may then complete the mail note by, for example, indicating the recipient's e-mail address and typing a message into the body of the e-mail note.

Desktop application programs that support sending a file as a link allow the sender to manipulate various user interface controls in order to generate an input command indicating that the file is to be sent as a link. In response to the sender's input commands, the desktop application program interacts with an e-mail application program in order to create a new e-mail note. The desktop application program then creates a link to the shared disk location of the file and inserts the link into the body of the new e-mail note. The desktop application may also insert the link into a "link file" that is sent as an attachment to the new e-mail note. The link file contains the link and not the actual data file that the sender intends to send to the recipient. Again, the sender may complete the e-mail note by, for example, indicating the recipient's e-mail address and typing a message into the body of the e-mail note.

There are several drawbacks associated with the prior art systems that support sending a file as either an attachment to an e-mail note or as a link. In the first instance, the prior art systems do not support sending a single e-mail note that includes a link to the shared disk location of the file as well as an attached copy of the file. Sending the file as both a link and an attachment would allow a recipient with access to the shared disk location to subsequently retrieve updated versions of the file and would allow a recipient without access to the shared disk location to at least receive the sent copy of the file. Accordingly, there is a need for sending a file to a recipient as both a link and as an attachment to an e-mail note.

In addition, the prior art systems require the sender to understand and appreciate the differences between an attachment and a link. For novice users of desktop application programs, the distinctions between an attachment and a link may not be obvious. As a result, for example, the sender may mistakenly send a file as a link to a recipient who does not in fact have access to the shared location of the file. Accordingly, there is a need for providing assistance to the sender in determining whether a file should be sent to a recipient as an attachment, as a link, or as both an attachment and a link.

Furthermore, the prior art systems may include a user interface for sending a file as an attachment and a separate user interface for sending a file as a link. The inclusion of multiple user interfaces tends to add clutter to the display and further confuse the sender. Accordingly, there is a further need for a single entry point to a user interface within a desktop application program for sending a file as an attachment, as a link, or as both an attachment and a link.

SUMMARY OF THE INVENTION

The present invention meets the above-described needs by providing a system and method for sending a file opened in a desktop application program from a sender to a recipient. The system and method of the present invention comprise functionality for automatically determining whether a file should be sent as a link, as an attachment, or as both a link and an attachment. Within the desktop application program, a single entry point to a user interface is provided for indicating that the file is to be sent. In response to the indication that the file is to be sent, a determination is made as to whether the file has been saved to a disk location. If the file has not been saved to a disk location, a copy of the file is sent to the recipient as an attachment to an e-mail note. If the document has been saved to the disk location, a determination is made as to whether the disk location is a shared disk location. If the file has not been saved to a shared disk location, a copy of the file is sent to the recipient as an attachment to an e-mail note.

If it is determined that the file has been saved to a shared disk location the file is sent to the recipient as a link to the shared disk location inserted into the body of an e-mail note. A file that has been saved to a shared disk location may be sent as both a link and an attachment. In order to determine if the file is to be sent as an attachment, a registry is checked in order to determine if the sender has previously indicated a send preference for sending shared files. If a send preference indicates that shared files are to be sent as attachments, the file is sent as both a link and an attachment. If a send preference indicates that shared files are not to be sent as attachment, the file is sent only as a link. If the sender has not previously indicated the send preference, the sender may be prompted to input a signal indicating whether the file is to be sent as an attachment. A send preference may then be created in response to the signal, if the sender so desires.

BRIEF DESCRIPTION OF THE DRAWING FIGS.

FIG. 1 is a block diagram illustrating an exemplary operating environment for implementation of the present invention.

Figure 2A:
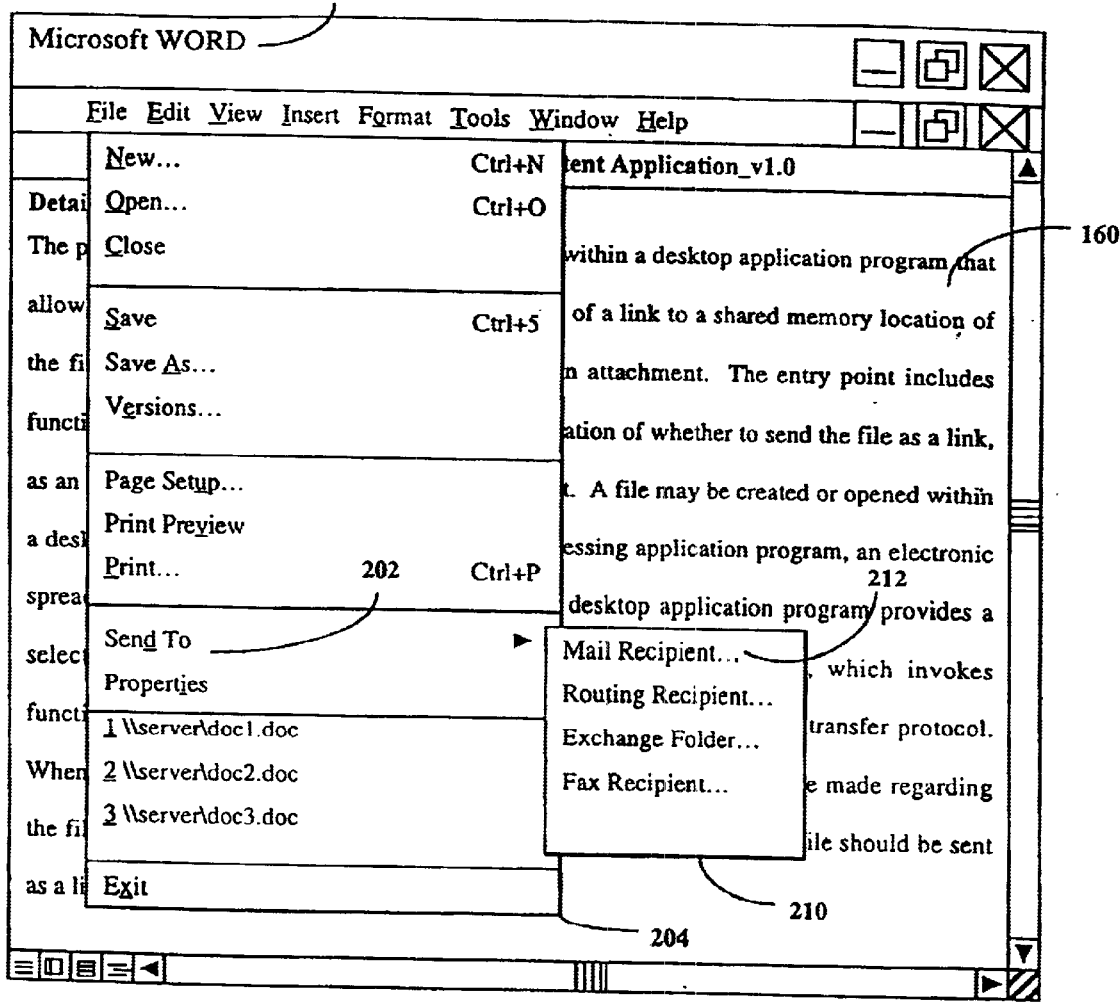
Figure 2B:
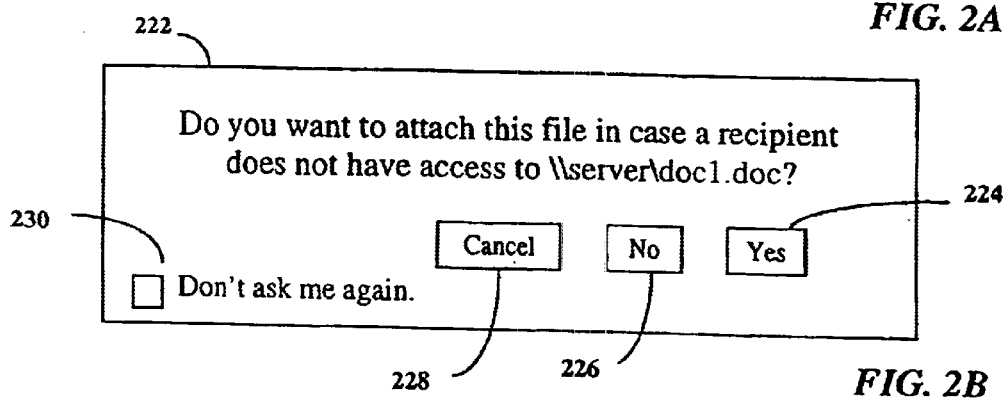

FIG. 2, comprising FIG. 2A and FIG. 2B, is a representation of an exemplary user interface for sending a file to a recipient from within a desktop application program, in accordance with an illustrative embodiment of the present invention.

Figure 3:
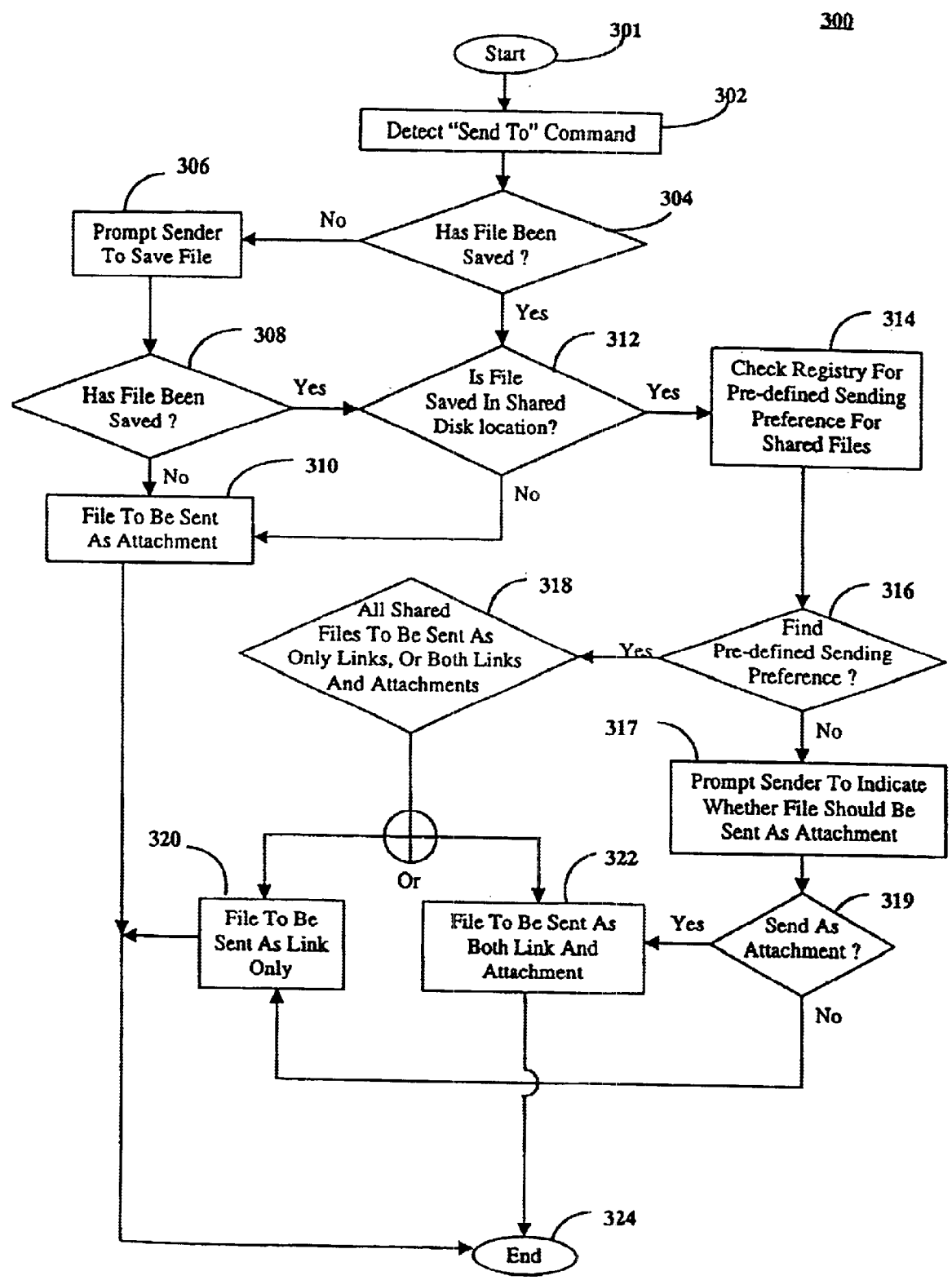

FIG. 3 is a flow chart illustrating an exemplary method for automatically determining whether a file should be sent to a recipient as a link or as an attachment to an e-mail note.

DETAILED DESCRIPTION OF EXEMPLARY EMBODIMENTS

The present invention provides a single entry point within a desktop application program that allows a sender to send a file via e-mail in the form of a link to a shared disk location of the file, as an attachment, or as both a link and an attachment. The entry point includes functionality for assisting the sender in the determination of whether to send the file as a link, as an attachment, or as both a link and an attachment. A file may be created or opened within a desktop application program, such as a word processing application program, an electronic spreadsheet application program, or the like. The desktop application program provides a selectable "Send To" command, for example as a file menu option, which invokes functionality for sending the file to a recipient via e-mail or another data transfer protocol. When the "Send To" command is detected, a number of determinations are made regarding the file to be sent, in order to assist the sender in determining whether the file should be sent as a link, as an attachment, or as both a link and an attachment.

Exemplary embodiments of the present invention will hereinafter be described with reference to the drawing, in which like numerals represent like elements throughout the several figures. FIG. 1 illustrates an exemplary operating environment for implementation of the present invention. The exemplary operating environment includes a general-purpose computing device in the form of a conventional personal computer 120. Generally, a personal computer 120 includes a processing unit 121, a system memory 122, and a system bus 123 that couples various system components including the system memory 122 to processing unit 121. System bus 123 may be any of several types of bus structures including a memory bus or memory controller, a peripheral bus, and a local bus using any of a variety of bus architectures. The system memory includes a read only memory (ROM) 124 and random access memory (RAM) 125. A basic input/output system (BIOS) 126, containing the basic routines that helps to transfer information between elements within personal computer 120, such as during start-up, is stored in ROM 124.

Personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127, magnetic disk drive 128, and optical disk drive 130 are connected to system bus 123 by a hard disk drive interface 132, a magnetic disk drive interface 133, and an optical disk drive interface 134, respectively. Although the exemplary environment described herein employs hard disk 127, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 120. For example, one or more data files 160 may be stored in the RAM 125 and/or hard drive 127 of the personal computer 120.

A number of program modules may be stored on hard disk 127, magnetic disk 129, optical disk 131, ROM 124, or RAM 125, including an operating system 135, one or more desktop application program modules 136, an e-mail application program 139, and other program modules 138. Program modules include routines, sub-routines, programs, objects, components, data structures, etc., which perform particular tasks or implement particular abstract data types. Aspects of the present invention may be implemented in the form of a "send file" program module 137 that is incorporated into or otherwise in communication with a desktop application program module 136. The desktop application program 136 generally comprises computer-executable instructions for creating or modifying a data file. The send file program module 137 generally comprises computer-executable instructions for determining whether a file should be sent as a link, as an attachment, or as both a link and an attachment. The send file program module 137 further comprises computer-executable instructions for communicating with the e-mail application program 139. The e-mail application program 139 generally comprises computer-executable instructions creating an e-mail note and sending the e-mail note to a recipient's e-mail address.

A user may enter commands and information into personal computer 120 through input devices, such as a keyboard 140 and a pointing device 142. Other input devices (not shown) may include a microphone, joystick, game pad, satellite dish, scanner, or the like. These and other input devices are often connected to processing unit 122 through a serial port interface 146 that is coupled to the system bus 123, but may be connected by other interfaces, such as a parallel port, game port, a universal serial bus (USB), or the like. A display device 147 may also be connected to system bus 123 via an interface, such as a video adapter 148. In addition to the monitor, personal computers typically include other peripheral output devices (not shown), such as speakers and printers.

Personal computer 120 may operate in a networked environment using logical connections to one or more remote computers 149. Remote computer 149 may be another personal computer, a server, a client, a router, a network PC, a peer device, or other common network node. While a remote computer 149 typically includes many or all of the elements described above relative to personal computer 120, only a memory storage device 150 has been illustrated in the figure. The logical connections depicted in the figure include a local area network (LAN) 151 and a wide area network (WAN) 152. Such networking environments are commonplace in offices, enterprise-wide computer networks, intranets, and the Internet.

When used in a LAN networking environment, personal computer 120 is connected to local area network 151 through a network interface or adapter 153. When used in a WAN networking environment, personal computer 120 typically includes a modem 154 or other means for establishing communications over WAN 152, such as the Internet. Modem 154, which may be internal or external, is connected to system bus 123 via serial port interface 146. In a networked environment, program modules depicted relative to personal computer 120, or portions thereof, may be stored in the remote memory storage device 150. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

FIG. 2 illustrates an exemplary user interface for sending a file in accordance with an exemplary embodiment of the present invention. As previously mentioned, the present invention provides a single entry point to a user interface for sending a file as a link, for sending a file as an attachment, and for sending a file as both a link and an attachment. As shown in the figure, the single entry point may be implemented as a "Send To" command 202 in a drop-down file menu 204. It should be noted that the "Send To" command 202 does not indicate whether the file is to be sent as a link or as an attachment. The present invention is designed to automatically determine the appropriate manner for sending a file, whenever possible. Therefore, there is no need to confuse the sender with options for sending a file as a link or as an attachment, or both.

When the sender creates or opens a file 160 in a desktop application program 136, such as a word processing application program, the "Send To" command 202 may be activated in order to invoke the functionality for sending the file 160 to a recipient. When the "Send To" command 202 is activated, the exemplary display provides a send submenu 210 for indicating whether the file 160 is to be sent to a mail recipient, a routing recipient, an exchange folder, or a fax recipient. While exemplary embodiments of the present invention have been discussed with respect to sending files via e-mail, it is contemplated that the inventive principles may also be applied to sending files via routing slips, electronic facsimiles, and other file transfer mechanisms or protocols.

However, with reference to the exemplary embodiments, when the sender selects the "Mail Recipient" option 212 for sending the file 160 via e-mail, the desktop application program 136 determines whether the file 160 is saved in a shared disk location. If the file 160 is not saved in a shared disk location, or is not saved to memory at all, the file 160 is to be sent as an attachment. Clearly if the file 160 is not saved in a shared location where it would be accessible to the recipient, it is not appropriate to send the file as a link.

If the file 160 is saved in a shared disk location, it is considered to be a shared file. The preferred embodiment of the present invention assumes that all shared files should be sent as links, which point to the shared disk location. By sending a shared file as a link, the recipient is able to access the shared file even after it has been subsequently modified by the sender. Thus, sending a shared file as a link provides greater levels of data concurrency. A shared file may be sent as both a link and an attachment, however it will never be sent as only an attachment in the preferred embodiment.

If it is determined that the file 160 is a shared file, the desktop application program 136 may prompt the sender to indicate whether the file 160 should be sent as an attachment. As mentioned, a shared document will, by default, be sent as a link. However, in certain situations, the sender may want to send the file 160 as an attachment as well, in case one or more of the recipients do not have access to the shared disk location where the file 160 resides. An example of a user interface prompt that may be employed to determine whether the sender wishes to send a shared file as a link and as an attachment is shown in FIG. 2B. The user interface prompt may be implemented as a dialog box 222, having a selectable "Yes" button 224 for accepting the action of sending the file 160 as an attachment, a selectable "No" button 226 for declining the action of sending the file 160 as an attachment, and a selectable "Cancel" button 228 for canceling the send operation.

As shown in FIG. 2B, the dialog box 222 may also include a selectable "Don't ask me again" checkbox 230 that allows the sender to express a desire for not being subsequently prompted to indicate whether a shared file is to be sent as an attachment. In the event that the user selects the "Don't ask me again" checkbox 230, the sender's preference for sending the instant file 160 is recorded in a data structure, such as a registry. Accordingly, if the sender selects the "Yes" button 224 to indicate that the instant file 160 is to be sent as both a link and an attachment, a "send preference" is recorded which specifies that all shared documents are to be sent as both links and as attachments. Similarly, if the sender selects the "No" button 226 to indicate that the instant file 160 is to be sent as only a link, a send preference is recorded which specifies that all shared documents are to be sent only as links. Then, when the sender subsequently selects the "Send To" command 202 and the "Mail Recipient" option 212 in order to send a shared file, the send preference will be referenced to determine the appropriate manner for sending the shared file and no user interface prompts will be displayed.

Those skilled in the art will appreciate that the drop-down menu 204, dialog box 222, selectable checkbox 230 and selectable buttons 224, 226 and 228 shown in FIG. 2A and FIG. 2B merely represent an example of a manner in which the user interface of the present invention may be implemented. Other types of graphical user interfaces that are well known in the art are considered to be within the scope of the present invention. In addition, other methods for determining a sender's "send preference" may be implemented in alternate embodiments of the present invention. For example, upon the initial launch of the desktop application program 136, the sender may be prompted to indicate a send preference for shared files. If the send preference is determined prior to selection of the "Send To" command 202, the dialog box 222 need not be displayed at all during a send operation.

When the "Send To" command is selected, the desktop application program 136 also communicates with an e-mail application program 139 in order to cause a new e-mail note to be created. Once created, the e-mail note is prepared for sending the file in the appropriate manner. If the file 160 is to be sent as a link, a link to the shared location of the file 160 is inserted into the body of the e-mail note. The link may also be saved in a link file that is attached to the e-mail note. The link file contains the link to the shared file and not the shared file itself. If the file 160 is to be sent as an attachment, a copy of the file 160 is created and is attached to the e-mail note. Similarly, if the file 160 is to be sent as a link and as an attachment, the link is inserted into the body of the e-mail note and the copy of the file 160 (and optionally a link file) is attached to the e-mail note.

After the e-mail note is set up with an attachment of a copy of the file 160, a link to the shared disk location of the file, or both an attachment and a link, the sender may complete and send the e-mail note. Completion of the e-mail note may involve, for example, inputting header information such as the recipients' e-mail address(es), a subject description, and the like. As in known in the art, certain header information may be input automatically when the "Send To" command 202 is invoked. For example, the title of the file 160 may automatically be input into the subject field of the header. Of course, the sender may be provided with the option to modify any header information that was input automatically.

Completion of the e-mail note may also involve inputting a message into the body of the e-mail note, attaching another file to the e-mail note, or any other conventional e-mail operation. User interface controls for completing and sending the new e-mail note may be provided by the desktop application program 136 or by the e-mail application program 139. In the preferred embodiment, the desktop application program 136 relinquishes control to the e-mail application program 139. The e-mail application program 139 may remain in operation until it is closed, exited, or otherwise disengaged.

FIG. 3 is a flow chart illustrating an exemplary method for determining whether to send a file as a link, as an attachment, or as both a link and an attachment. The exemplary method 300 begins at starting block 301 and proceeds to step 302, where a "send" command is detected. The send command indicates that a file is to be sent to a recipient via e-mail or another data transfer protocol. In response to detection of the "send" command, a determination is made at step 304 as to whether the file has been saved. If the document has not been saved, the method proceeds to step 306, where the sender is prompted to save the file. Then at step 308, a determination is made as to whether the sender saves the file in response to the prompt. If the user does not save the file, the method advances to step 310, where the conclusion is reached that the file is to be sent as an attachment. An unsaved file should obviously not be sent as a link to a shared disk location because no copy of the document exists in a permanent disk location.

However, if it is determined in either step 304 or step 306 that the document has been saved to a permanent disk location, the method proceeds to step 312, where a determination is made as to whether the disk location is a shared disk location. The determination as to whether the file is saved in a shared disk location may be accomplished by examining the address path of the disk location. Shared disk locations tend to be identified by certain types of address paths. Accordingly, if one of the certain types of address paths is detected, an assumption is made that the file is stored in a shared disk location. By way of example, a shared disk location is typically identified by a universal naming convention (UNC) path, such as "\\server\doc.1.doc;" a hyper text transfer protocol (http) path, such as "http.//server/doc.1.doc;" a secure hyper text transfer protocol (https) path, such as "https://server/doc.1.doc," a file transfer protocol (ftp) path, such as "ftp://server/doc.1.doc; or a mapped drive letter, such as "m:\doc1.doc."

If it is determined at step 312 that the file is not saved in a shared disk location, the method moves to step 310, where the file is sent as an attachment. However, if it is determined that the file is saved in a shared disk location, the method proceeds to step 314, where a registry is checked for a registry setting corresponding to a predefined "send preference." A send preference may indicate that the sender desires to send all shared files only as links, or as both links and attachments. A send preference may be defined by the sender and stored as a registry setting, for example, in response to a user interface prompt displayed during a sending operation (see step 317, below). As previously mentioned, the preferred embodiment of the present invention is configured for sending all shared files as links and the determination left to be made is whether a shared file should also be sent as an attachment. Still, those skilled in the art will appreciate that alternate embodiments of the present invention may also provide the option to send a shared document only as an attachment.

If at step 316 a registry setting is found indicating a send preference, the method proceeds to step 318 for interpretation of the sending preference. If at step 318 it is determined that the send preference specifies that all shared files are to be sent only as links, the method advances to step 320,where the file is sent only as a link. Similarly, if at step 318 it is determined that the send preference specifies that all shared files are to be sent as both links and attachments, the method advances to step 322,where a conclusion is reached that the file is to be sent as a both a link and as an attachment.

Returning to step 316, if no registry setting is found indicating a send preference, a user interface prompt is displayed at step 317 that allows the sender to indicate whether the file should be sent as an attachment. In a preferred embodiment, the prompt displayed at step 317 also allows the sender to indicate whether he/she wants to be presented with the prompt in the future. For example, a selectable checkbox or other control element may provide the sender with the option to generate a "Don't show this prompt again" command. If the user does not want to be presented with the prompt again, a registry setting may be created or updated to reflect the sender's sending preference for all shared files, which would be defined by the sender's response to the prompt with respect to sending the present shared file.

If at step 319 the sender responds to the prompt by indicating that the file is to be sent as an attachment, the method moves to step 322, where a conclusion is reached that the file is to be sent as a both a link and as an attachment. However, if at step 319 the sender responds to the prompt by indicating that the file is not to be sent as an attachment, the method moves to step 320, where a conclusion is reached that the file is to be sent only as a link After a conclusion is reached at step 310, step 320, or step 322 regarding the manner in while the file is to be sent, the exemplary method 300 ends at step 325.

Although the present invention has been described in connection with various exemplary embodiments, those of ordinary skill in the art will understand that many modifications can be made thereto within the scope of the claims that follow. For example, it is contemplated the principles if the invention may be extended to include an option for sending a file by copying the body of the file into the body of an e-mail note. Accordingly, it is not intended that the scope of the invention in any way be limited by the above description, but instead be determined entirely by reference to the claims that follow.

What is claimed is:

1. A method for sending a file opened in a desktop application program from a sender to a recipient comprising:

within the desktop application program, receiving an indication that the file is to be sent from the sender to the recipient;

in response to the indication that the file is to be sent, determining whether the file has been saved to a shared disk location;

in response to a determination that the file has been saved to the shared disk location, checking a registry in order to determine that the sender has previously indicated a send preference for sending shared files; and in response to a determination that the send preference indicates that shared files are to be sent as attachments:
launching an e-mail application program,
instructing the e-mail application program to create an e-mail note,
attaching a copy of the file to the e-mail note,
inserting a link to the shared disk location in a body of the e-mail note, and
instructing the e-mail application program to send the e-mail note to the recipient.

2. A computer readable medium having stored thereon computer-executable instructions for performing the method of claim 1.

3. The method of claim 1, wherein the method further comprises in response to a determination that that send preference indicates that shared files are to be sent only as links:
launching the e-mail application program,
instructing the e-mail application program to create the e-mail note,
inserting the link to the shared disk location in the body of the e-mail note, and
instructing the e-mail application program to send the e-mail note to the recipient.

4. A computer readable medium having stored thereon computer-executable instructions for performing the method of claim 3.

5. The method of claim 1, further comprising in response to a determination that the file has not been saved to the shared disk location,
launching the e-mail application program,
instructing the e-mail application program to create the e-mail note,
attaching the copy of the file to the e-mail note, and
instructing the e-mail application program to send the e-mail note to the recipient.

6. A computer readable medium having stored thereon computer-executable instructions for performing the method of claim 5.

7. The method of claim 1, further comprising:
in response to a determination that the file has not been saved to the shared disk location, determining that the file has not been saved to a disk location; and
in response to determining that the file has not been saved to the disk location;
launching the e-mail application program,
instructing the e-mail application program to create the e-mail note,
attaching the copy of the file to the e-mail note, and
instructing the e-mail application program to send the e-mail note to the recipient.

8. A computer readable medium having stored thereon computer-executable instructions for performing the method of claim 7.

9. The method of claim 1, wherein the indication that the file is to be sent from the sender to the recipient is received via a user interface having a single entry point; and wherein the indication does not specify whether the file is to be sent as an attachment or as the link.

10. A method for sending a file created in a desktop application program from a sender to a recipient comprising:
within the desktop application program, receiving an indication that the file is to be sent from the sender to the recipient;

in response to the indication that the file is to be sent, determining whether the file has been saved to a disk location;

if the file has been saved to the disk location, determining whether the disk location is a shared disk location;

in response to a determination that the file has not been saved to the disk location or a determination that the disk location is not a shared disk location:
launching an e-mail application program,
instructing the e-mail application program to create an e-mail note,
attaching a copy of the file to the e-mail note, and
instructing the e-mail application program to send the e-mail note to the recipient;

in response to a determination that the disk location is a shared disk location, checking a registry in order to determine if the sender has previously indicated a send preference for sending shared files;

in response to a determination that the sender has not previously indicated the send preference, prompting the sender to input a signal indicating whether the copy of the file is to be attached; and in response to a determination that the signal indicates that the copy of the file is to be attached:
launching the e-mail application program,
instructing the e-mail application program to create the e-mail note,
attaching the copy of file to the e-mail note,
inserting a link to the shared disk location in a body of the e-mail note, and
instructing the e-mail application program to send the e-mail note to the recipient.

11. A computer readable medium having stored thereon computer-executable instructions for performing the method of claim 10.

12. The method of claim 10, further comprising in response to the determination that the signal indicates that the copy of the file is to be attached, setting the send preference to indicate that shared files are to be sent as attachments and as links.

13. A computer readable medium having stored thereon computer-executable instructions for performing the method of claim 12.

14. The method of claim 10, further comprising in response to a determination that the signal indicates that the copy of the file is not to be attached:
launching the e-mail application program,
instructing the e-mail application program to create the e-mail note,
inserting the link to the shared disk location in the body of the e-mail note, and
instructing the e-mail application program to send the e-mail note to the recipient.

15. The method of claim 10, further comprising in response to a determination that the signal indicates that the copy of the file is not to be attached, setting the send preference to indicate that shared files are to be sent only as links.

16. A computer readable medium having stored thereon computer-executable instructions for performing the method of claim 15.

17. A computer system for sending a file opened in a desktop application program from a sender to a recipient comprising:
   a memory for storing the desktop application, the file, and an e-mail application program;
   an input device for generating an indication that the file is to be sent from the sender to the recipient; and
   a processing unit in communication with the input device and the memory for executing the desktop application program, the e-mail application program, and computer-executable instructions for:
      receiving from the desktop application program the indication that the file is to be sent;
      in response to the indication that the file is to be sent, determining whether the file has been saved to a shared disk location;
      in response to a determination that the file has been saved to the shared disk location, checking a registry in order to determine that the sender has previously indicated a send preference for sending shared files; and
      in response to a determination that the send preference indicates that shared files are to be sent as attachments:
         launching an e-mail application program,
         instructing the e-mail application program to create an e-mail note,
         attaching a copy of the file to the e-mail note,
         inserting a link to the shared disk location in a body of the e-mail note, and
         instructing the e-mail application program to send the e-mail note to the recipient.

18. The system of claim 17, wherein the processing unit further executes computer-executable instructions in response to a determination that send preference indicates that shared files are to be sent only as links:
   launching the e-mail application program,
   instructing the e-mail application program to create the e-mail note,
   inserting the link to the shared disk location in the body of the e-mail note, and
   instructing the e-mail application program to send the e-mail note to the recipient.

19. The system of claim 17, wherein the processing unit further executes computer-executable instructions for response to a determination that the file has not been saved to the shared disk location,
   launching the e-mail application program,
   instructing the e-mail application program to create the e-mail note,
   attaching the copy of the file to the e-mail note, and
   instructing the e-mail application program to send the e-mail note to the recipient.

20. The system of claim 17, wherein the processing unit further executes computer-executable instructions for:
   in response to a determination that the file has not been saved to the shared disk location, determining that the file has not been saved to a disk location; and
   in response to determining that the file has not been saved to the disk location:
      launching the e-mail application program,
      instructing the e-mail application program to create the e-mail note,
      attaching the copy of the file to the e-mail note, and
      instructing the e-mail application program to send the e-mail note to the recipient.

21. The system of claim 17, further comprising a display device for displaying a user interface having a single entry point;
   wherein the indication that the file is to be sent from the sender to the recipient is received via the user interface; and
   wherein the indication does not specify whether the file is to be sent as an attachment or as the link.

22. A computer system for sending a file opened in a desktop application program from a sender to a recipient comprising:
   a memory for storing the desktop application, the file, and an e-mail application program;
   an input device for generating an indication that the file is to be sent from the sender to the recipient; and
   a processing unit in communication with the input device and the memory for executing the desktop application program, the e-mail application program, and computer-executable instructions for:
      receiving from the desktop application program the indication that the file is to be sent;
      in response to the indication that the file is to be sent, determining whether the file has been saved to a shared disk location;
      in response to a determination that the file has been saved to the shared disk location, prompting the sender to input a signal indicating whether the copy of the file is to be attached; and
      in response to a determination that the signal indicates that the copy of the file is to be attached:
         launching the e-mail application program,
         instructing the e-mail application program to create the e-mail note,
         attaching the copy of file to the e-mail note,
         inserting a link to the shared disk location in a body of the e-mail note, and
         instructing the e-mail application program to send the e-mail note to the recipient.

23. The system of claim 22, wherein the processing unit further executes computer-executable instructions in response to the determination that the signal indicates that the copy of the file is to be attached, setting a send preference to indicate that shared files are to be sent as attachments and as links.

24. The system of claim 22, wherein the processing unit further executes computer-executable instructions for in response to a determination that the signal indicates that the copy of the file is not to be attached:
   launching the e-mail application program,
   instructing the e-mail application program to create the e-mail note,
   inserting the link to the shared disk location in the body of the e-mail note, and
   instructing the e-mail application program to send the e-mail note to the recipient.

25. The system of claim 22, wherein the processing unit further executes computer-executable instructions for in response to a determination that the signal indicates that the copy of the file is not to be attached, setting a send preference to indicate that shared files are to be sent only as links.

* * * * *